United States Patent
Swinford et al.

(10) Patent No.: US 8,096,552 B2
(45) Date of Patent: Jan. 17, 2012

(54) BELT OVERLOAD DEVICE

(75) Inventors: Brad A. Swinford, New Milford, CT (US); Boris Rozenfeld, New Milford, CT (US); David W. Purcell, New Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 860 days.

(21) Appl. No.: 12/142,950

(22) Filed: Jun. 20, 2008

(65) Prior Publication Data

US 2009/0318253 A1  Dec. 24, 2009

(51) Int. Cl.
  *B65H 5/02* (2006.01)
(52) U.S. Cl. .......................... 271/275; 198/813; 198/814
(58) Field of Classification Search .................. 474/101, 474/134, 135; 198/813, 814; 209/900; 271/275
See application file for complete search history.

(56) References Cited

U.S. PATENT DOCUMENTS

| | | | | |
|---|---|---|---|---|
| 2,753,812 A | * | 7/1956 | Wharton ....................... | 105/105 |
| 4,416,647 A | * | 11/1983 | White, Jr. ..................... | 474/134 |
| 5,429,249 A | | 7/1995 | Belec et al. | |
| 5,855,368 A | * | 1/1999 | Middelberg et al. .......... | 271/272 |
| 5,971,161 A | | 10/1999 | Branecky et al. | |
| 5,991,575 A | * | 11/1999 | Okiyama et al. .............. | 399/165 |
| 6,481,712 B1 | | 11/2002 | Yap | |
| 6,685,010 B2 | * | 2/2004 | Warnecke ..................... | 198/814 |
| 7,004,396 B1 | | 2/2006 | Quine et al. | |
| 2003/0176249 A1 | * | 9/2003 | Polster et al. ................. | 474/134 |
| 2005/0187052 A1 | * | 8/2005 | Yokoyama .................... | 474/117 |
| 2010/0158585 A1 | * | 6/2010 | Yasumoto .................... | 399/313 |

FOREIGN PATENT DOCUMENTS

EP  189735 A1 * 8/1986

* cited by examiner

*Primary Examiner* — Jeremy R Severson
(74) *Attorney, Agent, or Firm* — Brian A. Collins; Charles R. Malandra, Jr.; Steven J. Shapiro (57) ABSTRACT

An apparatus including a belt support system having a first belt support roller and a system for automatically moving the first belt support roller. The belt support system partially wraps a continuous belt on a belt drive roller. The belt support system includes the first belt support roller at an upstream side of the belt drive roller and a second belt support roller at a downstream side. The system for moving the first belt support roller moves the first roller from a first location relative to the belt drive roller to a second different location, based upon a predetermined load of the belt on the first belt support roller to thereby reduce an amount of wrap of the belt on the belt drive roller and reduce a length of the belt located proximate to the belt drive roller between the first and second belt support rollers.

11 Claims, 6 Drawing Sheets

BELT OVERLOAD DEVICE

FIELD OF THE INVENTION

The invention relates to a device and method for handling a continuous belt and, more particularly, to a device and method for compensating for high tension in a continuous belt.

BACKGROUND OF THE INVENTION

Mailpiece sorters may be used to sort incoming or outgoing mailpieces into bins, for example. One example of a mailpiece sorter is the OLYMPUS™ II MT sold by Pitney Bowes Inc. of Stamford, Conn. Some mailpiece sorters use continuous belts to transport the mailpieces through the system. In some cases, the belts may also be used to drive one or more components of the mailpiece sorter.

In conventional mailpiece sorters, an error condition, such as a mailpiece jam, for example, may go undetected. Such error conditions may result in rapid belt deceleration that may lead to high stress levels on the continuous belts and/or other components of the system. These high stress levels may damage the components or may result in system failure.

SUMMARY OF THE INVENTION

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In accordance with one aspect of the invention, an apparatus is provided including a belt support system having a first belt support roller, and a system for automatically moving the first belt support roller. The belt support system partially wraps a continuous belt on a belt drive roller. The belt support system includes the first belt support roller at an upstream side of the belt drive roller, and a second belt support roller at a downstream side. The system for automatically moving the first belt support roller can move the first roller from a first location relative to the belt drive roller to a second different location, based upon a predetermined load of the belt on the first belt support roller, to thereby reduce an amount of wrap of the belt on the belt drive roller and reduce a length of the belt proximate to the belt drive roller between the first and second belt support rollers.

In one embodiment, the first belt support roller in the first location and the second belt support roller may be configured to provide an amount of wrap of the belt on the belt drive roller of approximately 150 degrees or more. In another embodiment, the first belt support roller in the first location and the second belt support roller may be configured to provide an amount of wrap of the belt on the belt drive roller of approximately 165 degrees.

In a further embodiment, the first belt support roller in the second different location and the second belt support roller may be configured to provide an amount of wrap of the belt on the belt drive roller of approximately 130 degrees or less. In a still further embodiment, the first belt support roller in the second different location and the second belt support roller may be configured to provide an amount of wrap of the belt on the belt drive roller of approximately 128 degrees.

In accordance with another aspect of the invention, a method is provided comprising partially wrapping a continuous belt on a belt drive roller directly between a first belt support roller and a second belt support roller, wherein the second belt support roller is fixedly connected to a first frame member and the first belt support roller is fixedly located on a second frame member, and wherein the second frame member is pivotably connected to the first frame member; biasing the second frame member at a first position on the first frame member; and automatically moving the second frame member from the first position to a second position on the first frame member when the belt exerts a predetermined force on the first belt support roller. When the second frame member is moved from the first position to the second position an amount of wrap of the belt on the belt drive roller is reduced and a length of the belt between the first and second belt support rollers, proximate the belt drive roller, is reduced.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The foregoing aspects and other features of the invention are explained in the following description, taken in connection with the accompanying drawings, wherein.

DETAILED DESCRIPTION OF EXEMPLARY EMBODIMENTS

Figure 1:
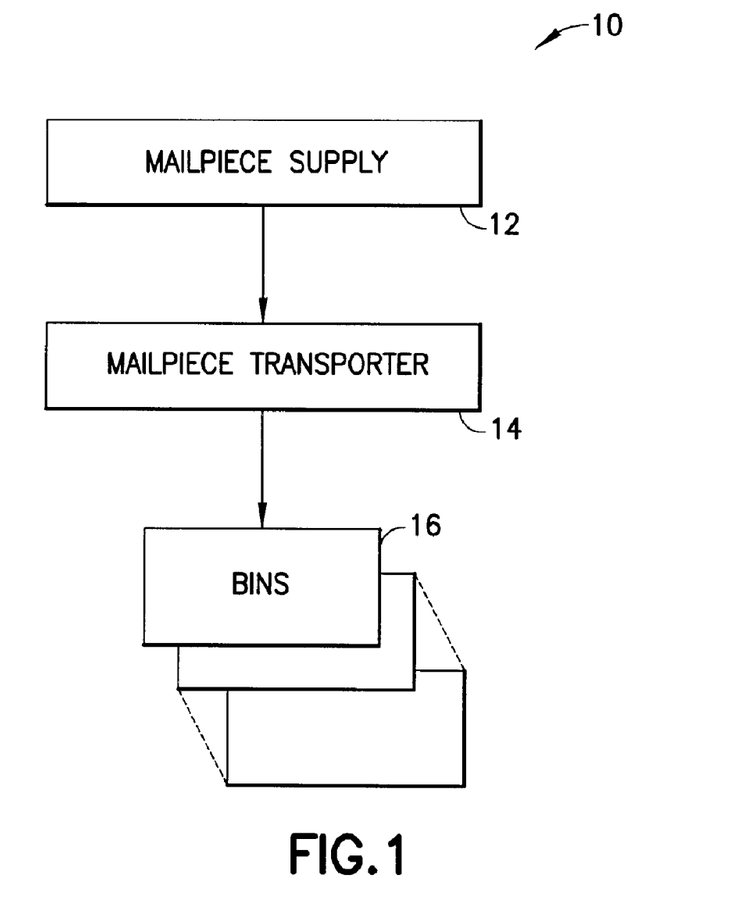
FIG. 1 is a block diagram of a machine incorporating features of the invention.

Referring to FIG. 1, there is shown a block diagram of a machine 10 incorporating features of the invention. Although the invention will be described with reference to the exemplary embodiments shown in the drawings, it should be understood that the invention can be embodied in many alternate forms of embodiments. In addition, any suitable size, shape, or type of elements or materials could be used.

Figure 2:
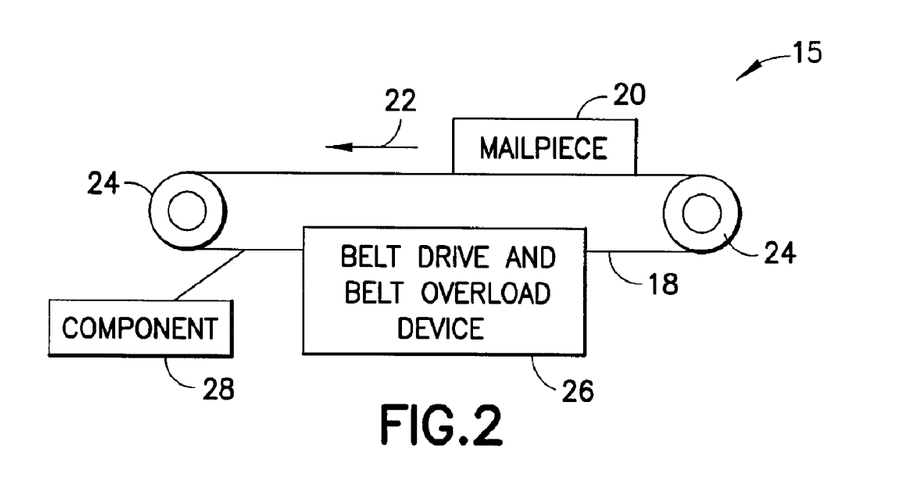
FIG. 2 is a schematic view of a mailpiece transport device used in the mailpiece transporter shown in FIG. 1.

The machine 10, in this embodiment, is a sorter for sorting incoming or outgoing mailpieces. However, features of the invention could be used in other types of machines that use a continuous belt. The machine 10 generally comprises a mailpiece supply 12, a mailpiece transporter 14, and bins 16, which receive mailpieces sorted to the bins from the mailpiece transporter 14. Referring also to FIG. 2, the mailpiece transporter 14 includes at least one mailpiece transport device 15. The mailpiece transporter 14 may comprise a plurality of the mailpiece transport devices 15 in series, and, in some embodiments, one or more in parallel. The mailpiece transport device 15 comprises a continuous belt 18, path support rollers 24 and a section 26 with a belt drive and a belt overload device, described below.

As shown in FIGS. 1 and 2, the belt 18 of the mailpiece transport device 15 moves mailpieces 20 at least partially along the transport path 22 between the supply 12 and the bins 16. The belt 18 forms a transport element to move the mailpieces 20 and may also be used to drive at least one component 28 of the mailpiece transport device. In some embodiments the continuous belt 18 is used solely to transport mailpieces.

The belt 18 is supported on the path support rollers 24 in a general loop. FIG. 2 shows two path support rollers 24, but other numbers of rollers may also be provided. The belt 18 extends through the section 26. The belt drive in the section 26 moves the belt to rotate the belt about the loop on the path support rollers 24.

Figure 3:
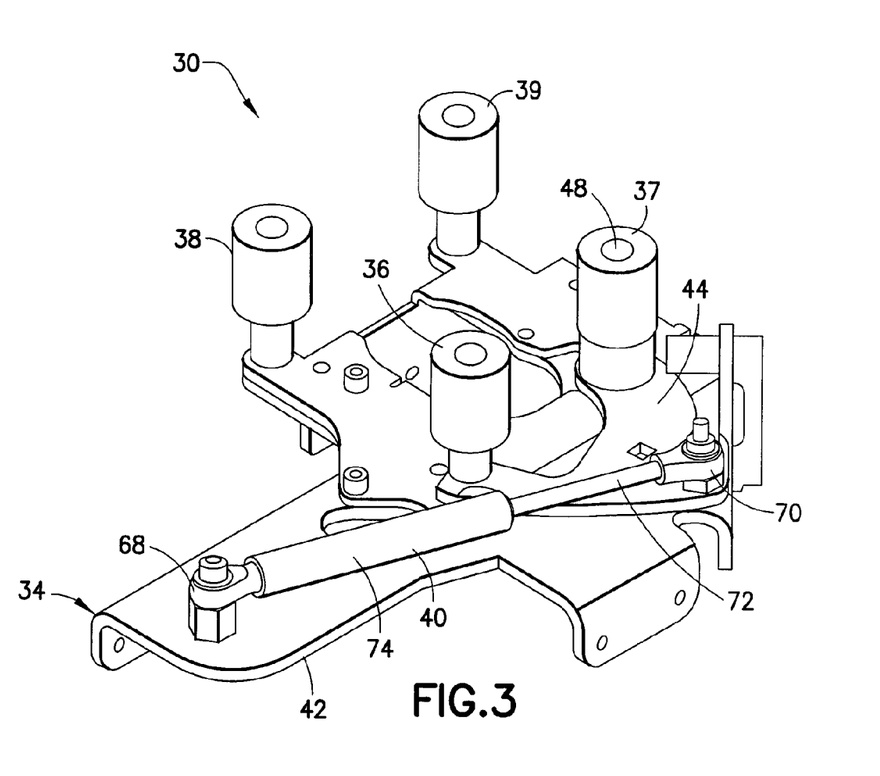
FIG. 3 is a perspective view of an embodiment of the belt overload device according to the invention.
Figure 4:
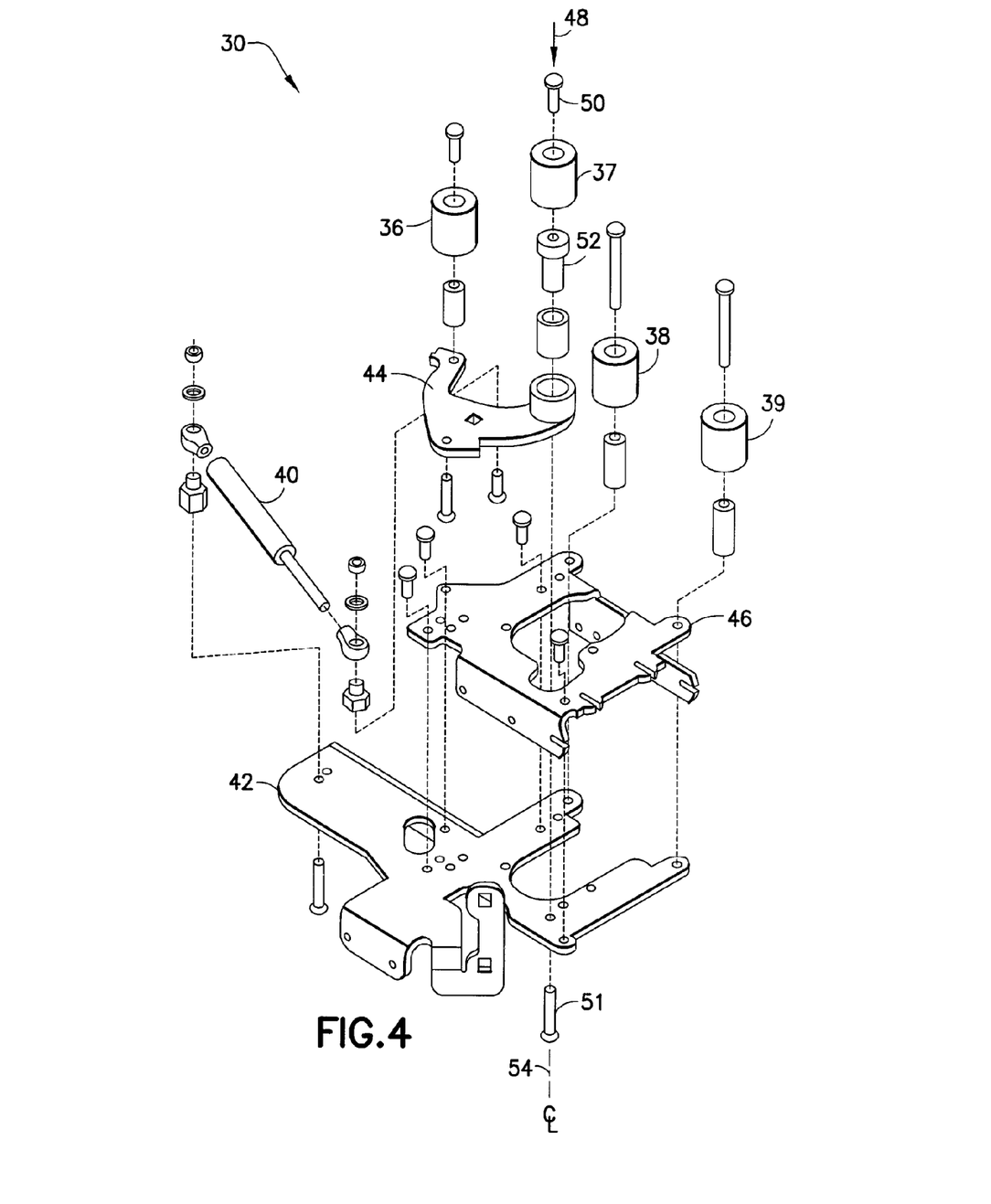
FIG. 4 is an exploded perspective view of the belt overload device shown in FIG. 3.

An embodiment of the belt overload device 30 according to the invention is shown in FIGS. 3 and 4. As shown, the belt overload device 30 generally comprises a frame 34, first through fourth belt support rollers 36, 37, 38, 39, respectively, and a spring 40.

In the illustrated embodiment, the frame 34 comprises a first frame member 42, a second frame member 44, and a third frame member 46. The first and third frame members 42, 46 are made as separate members for ease of manufacture, but alternatively may be a one-piece member or more than two members. The second frame member 44 is pivotably connected to the first frame member 42 by a connection 48 that includes fasteners 50, 51 and a rotational bearing 52 for the second roller 37. Thus, the second roller 37 is rotatably mounted at a fixed location on the first frame member along a common axis 54 with the pivotal connection of the second frame member 44 on the first frame member 42. However, in an alternate embodiment, a common axis might not be provided.

Figure 5:
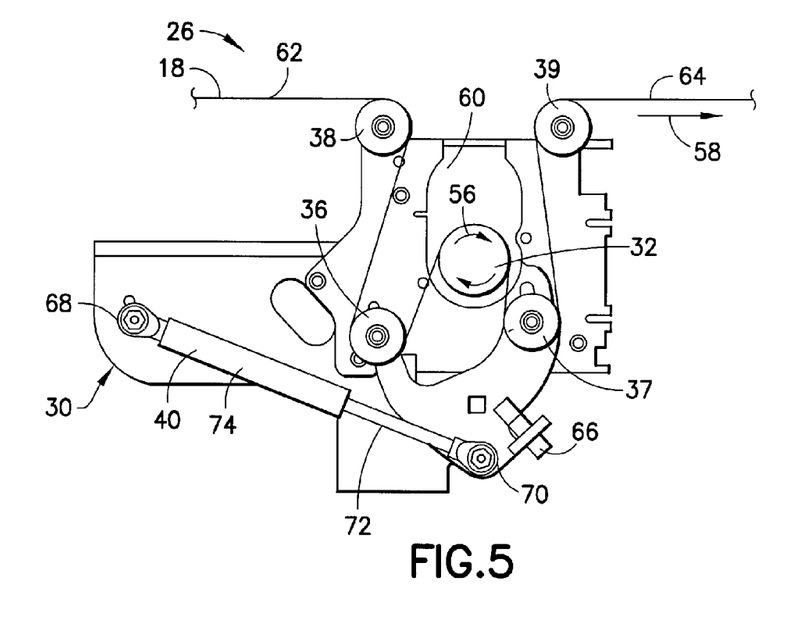
FIG. 5 is a side view of the belt overload device shown in FIGS. 3 and 4 shown attached to the belt and showing the drive roller.
Figure 6:
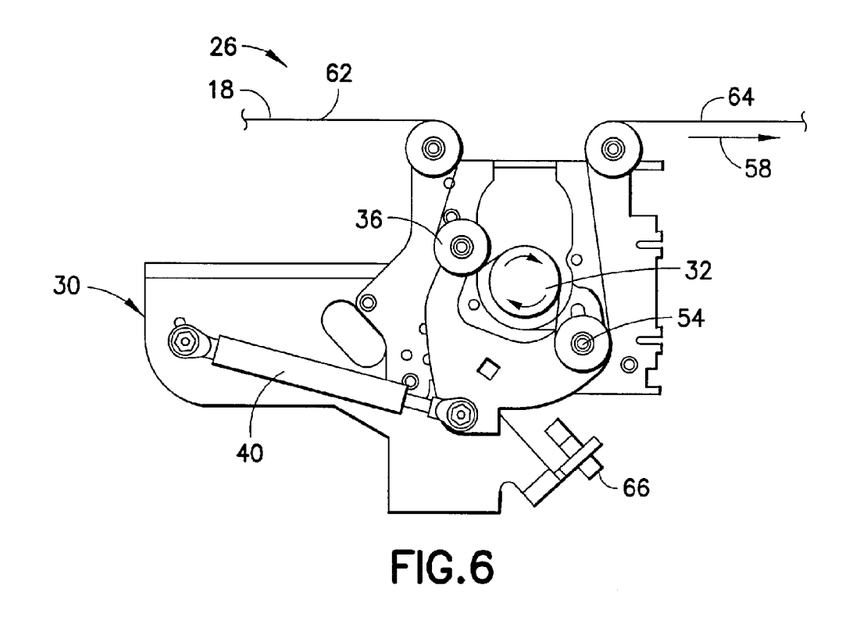
FIG. 6 is a side view as in FIG. 5 showing the belt overload device in a second different position.

FIGS. 5 and 6 show the belt drive roller 32 of the belt drive located relative to the belt overload device 30 and the belt 18 connected on the belt drive roller 32 and the belt overload device 30. FIG. 5 shows the belt overload device 30 at a first position. This first position is at the normal running condition of the belt 18. The belt 18 has a working length extending downstream from the second support roller 37 to the first support roller 36. The belt 18 is loaded, i.e., wrapped, against a portion of the drive roller 32 directly between the first and second support rollers 36, 37. As the drive roller 32 is rotated as indicated by arrows 56, such as by a motor of the belt drive, the frictional engagement of the belt 18 against the drive roller 32 causes the belt to move as indicated by arrow 58.

In the first position of the overload device 30, the first and second support rollers 36, 37 are located on a same side of the drive roller 32, one upstream and one downstream. The frame 34 has an opening 60 through which the drive roller 32 extends into the center location among the four support rollers 36-39. The belt 18 has a tight side 62 leading into the overload device 30 (because of pulling by the drive roller 32), and a slack side 64 leading away from the overload device 30.

In the embodiment illustrated in FIGS. 3-6, the spring 40 comprises a gas spring. However, in alternate embodiments, any suitable type of spring or system for biasing the first frame member at the first position relative to the second frame member could be provided.

An adjustable set screw 66 is provided as a stop to adjust positioning of the second frame member 44 relative to the first frame member 42 at the first position. However, an adjustment system might not be provided, or any suitable alternative adjustment system could be provided.

The spring 40 has a first end 68 connected to the first frame member 42 and a second end 70 connected to the second frame member 44. The spring 40 has a movable rod 72 that is able to longitudinally slide in and out of the main spring housing 74. As can be seen best in FIGS. 3 and 5, when the overload device 30 is in the first position, i.e., normal operating position, the rod 72 is at an extended position relative to the main spring housing 74. During normal belt operation, the normal belt tension allows the gas spring to remain substantially fully extended, leaving the system to run normally. However, in the event of a hard jam of the belt 18, which results in a rapid deceleration of the belt or a significantly higher belt tension than the normal operating belt tension, the spring 40 can compress.

Referring also to FIG. 6, the belt overload device 30 is shown when the tight side 62 of the belt 18 is experiencing a significantly higher belt tension than the normal operating belt tension. The higher belt tension causes the second frame member 44 to pivot at the axis 54 and moves the first support roller 36 to the new location shown. The spring 40 compresses under the increased load to allow the first frame member to move to the new location. The second support roller 37 remains at the same position relative to the frame members.

In this second different position of the overload device, the first support roller 36 is moved to an opposite side of the drive roller 32 (at least partially) relative to the second support roller 37. This causes the amount of wrap, i.e., amount of area of contact between the belt 18 and the drive roller 32 to be reduced. In addition, the length of the belt 18 between the first and second rollers 36, 37 proximate to the drive roller is reduced, while the working length of the belt downstream from the second roller 37 to the first roller 36 is increased. This allows a softer stop of the entire belt system, unloading the slack side tensioner (not shown) and partially unwrapping the belt from the drive roller.

Thus, the invention provides an overload device that may prevent damage to system components in a transport device encountering hard jams resulting in immediate belt stops. The invention may also provide a way to sense and report such occurrences to a system operator so that the conditions can be addressed.

Embodiments of the invention may prevent the inertia of the moving belt from overloading itself and the other components associated with the belt. In addition, the overload device may allow an additional portion of the belt into the system so that the slack side tensioner can be unloaded to reduce overall belt tension. Still further, the overload device may reduce the wrap of the belt on the drive shaft roller and, therefore, reduce the total amount of power that it can transfer into the belt.

Embodiments of the invention may provide inertia dispersion in the belt. In one example, the belt drive roller 32 drives the belt 18 at 170 inches per second. In a normal running condition, the belt moves through the belt overload device 30 and the spring 40 is in a fully extended position. When a hard jam occurs, the device quickly unloads to allow all the belt of the slack side of the device to come to a quick, but much more gradual stop. This more gradual stop may reduce the load on all components of the system.

Embodiments of the invention may also provide the feature of allowing an additional length of belt into system when a jam occurs. In another example, with the machine running in a normal condition, the slack in the belt (on the slack side) is tensioned to a consistent load. Upon an overload condition, the belt overload device 30 senses that overload and releases. This allows an additional belt length to be released to the slack side, unloading the slack side tensioner and reducing the amount of friction that can be carried between the drive roller and the belt.

Embodiments of the invention may also provide the feature of partial unwrapping of the belt on the drive roller. One of the factors that determine the amount of drive that can be loaded into the belting system is the wrap angle of the belt on the drive roller. For example, in a normal operating condition, a high amount of wrap may be used to maintain correct speed and allow for quick starts. In an overload condition, however, a high amount of wrap may be detrimental in that it may allow the drive pulley to overload the belting system. The belt overload device of the invention may decrease the belt wrap angle when an overload occurs, thereby lowering the belt tension and further protecting the system.

In one example, under normal operating conditions the slack side belt tension is maintained at approximately 8 lbs. This, along with a wrap of the belt on the drive roller of approximately 165 degrees (2.88 radians) and a friction coefficient of 0.72 causes a maintainable tension ratio from the slack side to the tight side to be approximately 7.95. Accordingly, the tight side can reach a tension that is approximately 7.95 times that in the slack side, or approximately 63.6 lbs. of belt tension.

With the automatic unwrapping provided by the invention, in an overload condition, the wrap can decrease to approximately 128 degrees (2.23 radians), the ratio decreases to approximately 4.98, and the tight side tension decreases to approximately 39 lbs. With a gas spring having a 100 lb. initial load, this allows the system to climb to a belt tension of approximately 44 lbs. before the device reacts, based on the geometry of the system. When the jam is corrected, the spring 40 automatically resets the belt overload device 30 back to the first position shown in FIG. 5. As noted above, this is merely an exemplary embodiment. The invention could be used with other loads, angles, ratios, and dimensions, for example.

Figure 7:
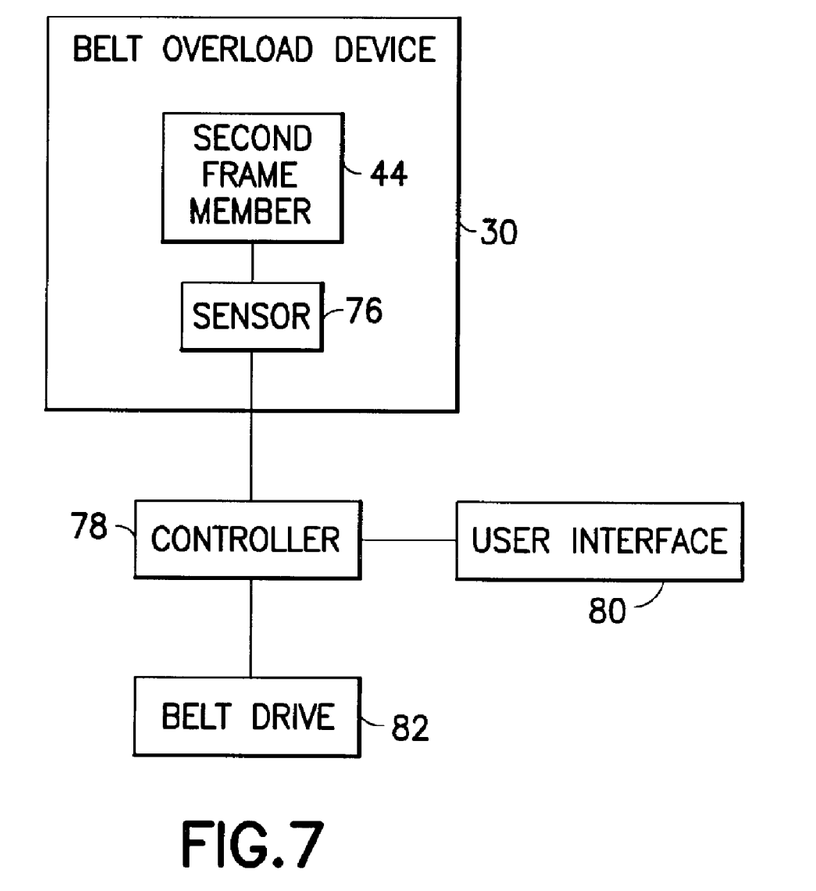
FIG. 7 is a block diagram illustrating features of a sensing and signaling system of the invention.

Referring also to FIG. 7, in one embodiment the belt overload device 30 comprises a sensor 76. The sensor 76 is configured to sense when the second frame member 44 is moved from its first position to its second position. In other words, the sensor 76 may be used to determine when the overload device 30 has been actuated. The sensor 76 may be connected to a controller 78.

In one embodiment, the controller comprises a computer including a microprocessor and memory, for example. The controller 78 may be connected to a user interface 80, such as a display screen, to function as a signaling device to the user. The controller 78 can be configured to indicate the occurrence of actuation of the overload device 30 on the display screen. Additional or alternative signaling devices may be provided, such as an audio signaling device and/or a flashing/rotating warning light, for example. The controller 78 may be connected to the belt drive 82, which rotates the drive roller 32. The controller 78 may be configured or programmed to stop the belt drive 82 when the overload condition is sensed by the sensor 76.

Figure 8:
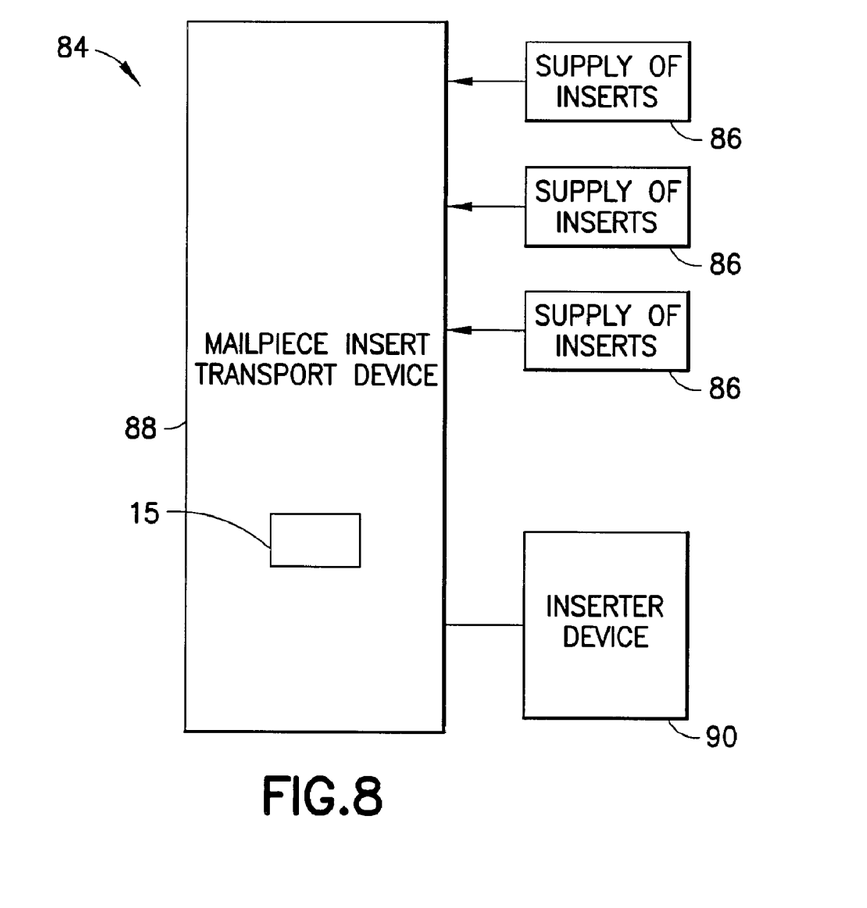
FIG. 8 is a block diagram illustrating an implementation of the invention in a different type of machine from that shown in FIG. 1.

Referring also to FIG. 8, features of the invention may be used in a mailpiece assembler 84. The illustrated mailpiece assembler 84 is configured to collate mailpiece inserts from a plurality of supplies 86 and insert the assembly into envelopes. The mailpiece assembler 84 includes a mailpiece insert transport device 88 and a inserter device 90. The mailpiece insert transport device 88 comprises at least one of the transport devices 15. This example illustrates that features of the invention can be used in other apparatus having a continuous belt and is not limited to a mailpiece sorter.

It should be understood that the foregoing description is only illustrative of the invention. Various alternatives and modifications can be devised by those skilled in the art without departing from the invention. For example, features recited in the various dependent claims could be combined with each other in any suitable combination(s). Accordingly, the invention is intended to embrace all such alternatives, modifications, and variances that fall within the scope of the appended claims.

What is claimed is:

1. An apparatus, comprising:
a belt support system for partially wrapping a continuous belt on a belt drive roller, the belt support system comprising:
a first belt support roller at an upstream side of the belt drive roller; and
a second belt support roller at a downstream side of the belt drive roller, wherein the first and second belt support rollers are configured to wrap the belt partially on the belt drive roller directly between the first and second belt support rollers;
a first frame member and a second frame member pivotably connected to the first frame member,
the first belt support roller rotatable mounted on the second frame member at a first location and the second belt support roller rotatably mounted on the first and second frame members at a common second location, the common second location forming a pivot axis for pivoting the second frame member relative to the first frame member, and
a system for moving the first belt support roller from a first location relative to the belt drive roller to a second different location, based upon a predetermined load of the belt on the first belt support roller, to thereby reduce an amount of wrap of the belt on the belt drive roller and reduce a length of the belt proximate to the belt drive roller between the first and second belt support rollers.

2. The apparatus of claim 1, wherein the belt support system further comprises:
a third belt support roller rotatably mounted on the first frame member, wherein the third belt support roller is located at the upstream side of the belt drive roller at an upstream location from the first belt support roller; and
a fourth belt support roller rotatably mounted on the first frame member, wherein the fourth belt support roller is located at the downstream side of the belt drive roller at a downstream location from the second belt support roller.

3. The apparatus of claim 1, wherein the system for moving the first belt support roller relative to the belt drive roller comprises a spring biasing the first belt support roller to the first location relative to the belt drive roller.

4. The apparatus of claim 3, wherein the spring comprises a gas spring.

5. The apparatus of claim 1, further comprising:
a sensor for detecting when the first belt support roller is moved from the first location relative to the belt drive roller to the second different location; and
a signaling device for notifying a user in response to detection by the sensor.

6. The apparatus of claim 1, wherein the first belt support roller in the first location and the second belt support roller are configured to provide an amount of wrap of the belt on the belt drive roller of approximately 150 degrees or more.

7. The apparatus of claim 6, wherein the first belt support roller in the first location and the second belt support roller are configured to provide an amount of wrap of the belt on the belt drive roller of approximately 165 degrees.

8. The apparatus of claim 1, wherein the first belt support roller in the second different location and the second belt support roller are configured to provide an amount of wrap of the belt on the belt drive roller of approximately 130 degrees or less.

9. The apparatus of claim 8, wherein the first belt support roller in the second different location and the second belt support roller are configured to provide an amount of wrap of the belt on the belt drive roller of approximately 128 degrees.

10. The apparatus of claim 1, further comprising:
the continuous belt, wherein the apparatus is configured to transport mailpieces along a transport path formed by the continuous belt; and
a plurality of bins proximate to the transport path, wherein the continuous belt is configured to deliver the mailpieces to the bins.

11. The apparatus of claim 1, further comprising:
the continuous belt, wherein the apparatus is configured to transport mailpiece inserts along a transport path formed by the continuous belt; and
an inserter device associated with the continuous belt, wherein the inserter device is configured to insert the mailpiece inserts from the continuous belt into envelopes.

* * * * *